United States Patent [19]
Sokol

[11] Patent Number: 5,773,487
[45] Date of Patent: *Jun. 30, 1998

[54] FINISHING COMPOSITION WHICH IS CURABLE BY UV LIGHT AND METHOD OF USING SAME

[75] Inventor: Andrew A. Sokol, North Olmstead, Ohio

[73] Assignee: UV Coatings, Inc., Beachwood, Ohio

[ * ] Notice: The term of this patent shall not extend beyond the expiration date of Pat. No. 5,453,451.

[21] Appl. No.: 533,679

[22] Filed: Sep. 26, 1995

Related U.S. Application Data

[63] Continuation-in-part of Ser. No. 38,518, Mar. 29, 1993, Pat. No. 5,453,451, which is a continuation of Ser. No. 701,442, May 15, 1991, abandoned.

[51] Int. Cl.$^6$ .................................................... C08F 2/46
[52] U.S. Cl. ............................... 522/42; 522/75; 522/81; 522/103; 522/182; 427/519
[58] Field of Search .................................. 522/42, 75, 81, 522/103, 182; 427/519

[56] References Cited

U.S. PATENT DOCUMENTS

| | | | |
|---|---|---|---|
| 4,273,831 | 6/1981 | Singelyn | 428/402 |
| 4,282,269 | 8/1981 | Lucey | 427/54.1 |
| 4,415,603 | 11/1983 | Valiot | 427/54.1 |
| 4,600,649 | 7/1986 | Leo | 428/412 |
| 4,721,734 | 1/1988 | Gehlhaus | 522/8 |
| 4,902,725 | 2/1990 | Moore | 522/42 |
| 4,973,611 | 11/1990 | Puder | 522/42 |
| 5,453,451 | 9/1995 | Sokol | 522/42 |

OTHER PUBLICATIONS

Interez, Inc. CELRAD 3702, 1986.
Interez, Inc. CELRAD 3200, 1986.

*Primary Examiner*—Mark Chapman
*Attorney, Agent, or Firm*—Weintraub DuRoss & Brady

[57] ABSTRACT

A sprayable coating composition is formulated using one or more acrylates and one or more photoinitiators which act to polymerize the composition when exposed to ultraviolet light. Because of the use of low molecular weight monomers or oligomers, the composition is essentially free of volatile organic solvents, and therefore evaporative emissions in curing are substantially eliminated.

11 Claims, No Drawings

5,773,487

FINISHING COMPOSITION WHICH IS CURABLE BY UV LIGHT AND METHOD OF USING SAME

CROSS-REFERENCE TO RELATED APPLICATIONS

This Application is a continuation-in-part-application of U.S. patent applications Ser. Nos. 08/038,518, filed Mar. 29, 1993 now U.S. Pat. No. 5,453,451, for "Finishing Composition Which Is Curable By UV Light and Method of Using Same" which, in turn is a continuation of U.S. patent application Ser. No. 07/701,442, filed May 15, 1991 now abandoned, of the same title, disclosures of which are hereby incorporated by reference.

BACKGROUND OF THE INVENTION

1. Field of the Invention

The present invention relates to a substantially solvent-free coating composition which is curable by the application of ultraviolet light thereto, and a method of using the composition. More particularly, the present invention relates to such a coating composition which includes a polymerizable compound which includes at least one acrylate-containing compound and a photoinitiator which initiates a polymerization reaction in the composition when it is exposed to ultraviolet light.

2. Prior Art

Wood finishes are commonly used to treat wood for use in household items such as furniture, cabinets, decorative trim, etc. In addition, other coating compositions may be used to treat or coat stone, glass, plastic, metals or other materials.

Normally, finishing compounds include either an organic solvent, oil, alcohol or else are water-based. The organic solvents which are often used to thin coating compositions are volatile and therefore pose significant fire hazards, which makes fire insurance difficult to obtain for companies in the business of finishing wood products. Another problem which is occasioned by the use of these volatile organic solvents (vocs) is that these solvents can create a real health hazard to employees who are chronically exposed to the fumes thereof. Renal problems, as well as other health-related difficulties, may ensue from long-term exposure of workers to these chemicals.

With increasing consciousness about environmental and other hazards of the release of volatile components from many of these finishing compounds, a need now exists in the coating and finishing art for a coating composition which is substantially free of volatile components, in order to improve the environmental compatibility of such coatings. In addition, it would be advantageous if such a coating composition could be formulated which would be very quickly curable in order to maximize efficiency of production.

Many coating compositions are known. A few examples of some previously known coating compositions follow.

U.S. Pat. No. 4,940,841, issued to Dickerhof, discloses an aqueous-based two-component paint system which includes a self-crosslinking amido-acrylate resin, melamine resin, urea resin, polyol, amine, and acid curing component.

U.S. Pat. No. 4,170,671, issued to Youji et al, discloses a method for the treatment of a metal surface by applying a treating liquid thereto which includes an acrylic polymer and a chromium compound. The composition of Youji et al is asserted to improve corrosion resistance of metal when applied thereto.

U.S. Pat. No. 2,829,067, issued to Eastland, discloses a wood finishing composition consisting of methylmethacrylate resin and borax. The composition of Eastland is applied as an aqueous emulsion.

U.S. Pat. No. 4,212,928, issued to Arney, discloses a spreadable putty for filling imperfections or defects in wooden articles, which is a composite including wood cellulose and a polymer which includes methylmethacrylate, ethylacrylate, methacrylic acid, and pentaerythritol triacrylate.

U.S. Pat. No. 4,968,536, issued to Doebler, discloses a process for the production of a chip resistant coating finish which includes a carboxyl-containing polyester or methacrylate and a vinyl compound neutralized with a nitrogen base and also includes an isocyanate prepolymer and auxiliary additives. The coatings of Doebler are aqueous based and are essentially free of volatile organic solvents, but require sufficient drying time to evaporate the water.

An overview of some currently known technologies in coating compositions which are curable upon exposure to ultraviolet light may be found in the October, 1990 issue of Paint & Coatings Industry on pages 72–78. The focus of this article is primarily on polyester-based systems which require solvents as thinners.

An article about ultraviolet radiation-curable cellulose lacquers may be found on pages 38–46 of the November 1990 issue of Modern Paint and Coatings. However, the coatings discussed in this article required an 18 hour curing time at 25°–30° C. followed by four hours in a vacuum oven at 45° C.

Although many types of coating finishes are known, a need still exists in the art for an improved coating composition which is quick to cure for promoting efficiency of production processes. In addition, it would be advantageous if such a quick-curing coating composition did not contain volatile organic solvents, in order to minimize the health, safety, and environmental risks posed by such solvents.

SUMMARY OF THE INVENTION

The present invention provides an improved sprayable coating composition which cures very quickly upon exposure to sunlight or ultraviolet light, as well as upon exposure to electron beams. The composition of the present invention is primarily made up of solids and is, preferably, substantially free of solvents. Thus, the composition is curable upon exposure to sunlight, ultraviolet light or electron beam irradiation, generally, without requiring evaporation of a solvent therefrom.

A coating composition in accordance with the present invention, generally, comprises:

from about 80 to about 99.5 percent by weight, based on the total weight of the composition, of a polymerizable compound which comprises an acrylate; and from about 0.1 to about 15 percent by weight, based on the total weight of the composition, of a photoinitiator which initiates a polymerization reaction in the composition when it is exposed to the requisite energy source. Where electron beam energy is used, the photoinitiator may be eliminated.

The polymerizable compound may be selected from the group consisting of urethane acrylates, polyester acrylate, monoacrylates, diacrylates, triacrylates, polyacrylate and the like, and mixtures thereof.

For a more complete understanding of the present invention, the reader is referred to the following detailed description section, which should be read in conjunction with the accompanying examples. Throughout the following description and in the examples, all parts are intended to be by weight, absent indications to the contrary.

DESCRIPTION OF THE PREFERRED EMBODIMENT

The present invention provides a sprayable, substantially solvent-free coating composition which is especially useful for coating wood, metal or plastic articles, and which may be made up either as an opaque or a transparent coating composition. The composition hereof is especially advantageous, as contrasted with the known coating compositions, in that it does not generate any significant organic volatile evaporative emission component during the curing process and further, does not require the evaporation of any oil, alcohol or water-based solvent to complete the curing process. Rather, the curing is effected by a rapid polymerization reaction which is initiated by a photoinitiator component of the composition when it is exposed to an energy source, which is either direct sunlight, ultraviolet light, or other natural or artifical ultraviolet light. Alternatively, and as discussed below, election beam energy can be used to polymerize the acrylate. Substantially, the entire composition remains in place on the substrate during and after curing.

As noted, the coating composition of the present invention, generally and, preferably, comprises:

from about 80 to about 99.5 percent, by weight, based on the total composition weight, of a polymerizable compound which comprises an acrylate; and from about 0.1 to about 15 percent, by weight, based on the total composition weight, of a photoinitiator which initiates a polymerization reaction in the composition when it is exposed to ultraviolet light.

Preferably, the composition hereof includes from about 93 to about 99.9 percent of the polymerizable compound and from about 0.1 to about 7 percent of the photoinitiator, by weight.

In a preferred embodiment hereof, the coating composition hereof comprises 68 to 84 percent of a first triacrylate, 15 to 25 percent of a second monoacrylate, and 0.1 to about 7 percent of the photoinitiator.

The polymerizable compound may be selected from the group consisting of monoacrylates, diacrylates, triacrylates, polyacrylates, urethane acrylates, polyester acrylates, and the like, as well as mixtures thereof. The polymerizable compound, preferably, includes a mixture of acrylates. Suitable compounds which may be used in the practice of the present invention include, but are not limited to, trimethylolpropane triacrylate, alkoxylated trimethylolpropane triacrylate, such as ethoxylated or propoxylated trimethyolpropane triacrylate, 1,6-hexane diol diacrylate, isobornyl acrylate, aliphatic urethane acrylates, vinyl acrylates, epoxy acrylates, ethoxylated bisphenol A diacrylates, trifunctional acrylic ester, unsaturated cyclic diones, polyester diacrylates, and mixtures of the above compositions.

The photoinitiator which is used in the composition of the present invention may be of the free radical or cationic type. A combination of photoinitiators may be used. Photoinitiators which are suitable for use in the practice of the present invention include, but are not limited to, 1-phenyl-2-hydroxy-2-methyl-1-propanone, oligo{2-hydroxy-2 methyl-1-[4-(methylvinyl)phenyl]propanone}, 2-hydroxy 2-methyl 1-phenyl propan-1 one, bis (2,6-dimethoxybenzoyl)-2,4,4-trimethylpentyl phosphine oxide, 1-hydroxycyclohexyl phenyl ketone and benzophenone as well as mixtures thereof.

Other useful initiators include, for example, bis(n,5,2,4-cyclopentadien -1-yl)-bis[2,6 -difluoro-3-(1H-pyrol-1-yl) phenyl] titanium and 2-benzyl -2-N,N-dimethyl amino -1-(4-morpholinophenyl) -1- butanone. Both of these compounds are commercially available and sold by CIBA under the names IRCACURE 784 DC and IRGACURE 369, respectively.

These latter two initiators enable visible sunlight cure and high pigment loading cure.

Still other useful photoinitrators include, for example, 2-methyle -1- [4(methylthio) -2- morpholinopropan]-1-one, 4-(2-hydroxy) phenyl -2-hydroxy -2-(methylpropyl)ketone, 1-hydroxy cyclohexyl phenyl ketone benzophenone, (n-5,2, 4-cyclopentadien -1-yl) [1,2,3,4,5,6-n)-(1-methylethyl) benzene]-iron(+) hexafluorophosphate (−1), 2,2 -dimethoxy -2-phenyl-1-acetophen-one 2,4,6- trimethyl benzoyl-diphenyl phosphine oxide, benzoic acid, 4-(dimethyl amino) -ethyl ether, as well as mixtures thereof.

Yet other useful photoinitiators include those sold by Sartomer under the name ESACURE, including the EB3, KB1, TZT, KIP 100F, ITX, EDB, X15 and KT37 ESACURE photoinitiators, these all being commercially available.

A preferred coat composition hereof comprises 65 to 85 percent propoxylated trimethylol propane triacrylate, 15 to 25 isobornyl acrylate, and 0.1 to about 7 percent of a photoinitiator which is a mixture of bis (2,6-dimethylbenzoyl) 2,4,4-trimethylpentyl phosphine oxide and 2-hydroxy- 2-methyl-1-phenyl-propan-1-one, sold commercially by CIBA-GElGY under the Mark IRGACURE 1700 or IRGACURE CGI1700. This photoinitiator enables both high pigment loading and sunlight cure.

Thus, a preferred pigmented formula in accordance with the present invention comprises 60 to 80 percept of the triacrylate, 15 to 25 percent of the isobornyl acrylate, 0.1 to 50 percent pigment solids, and 0.1 to 7 percent of the IRGACURE 1700 photoinitiator.

It is to be appreciated that the present invention may be cured by natural sunlight, by medium pressure mercury arc lights, or by long wave ultraviolet light depending on the photoinitiator package used. Also, as noted, the polymerization may be election beam initiated, thus, omitting the need for the photoinitiator.

Likewise, and as noted hereinabove, depending on the photoinitiator package, high pigment loading is available. Pigment loading up to about 90 percent by weight of the composition is possible, although not necessarily desirable because of economic reasons.

The composition of the present invention is a significant improvement over the prior art coating compositions because of the fact that it does not contain any significant water or organic solvent which must be evaporated before curing is complete. Rather, the present invention includes low molecular weight polymerizable monomers and/or oligomers which are polymerized in place upon exposure to ultraviolet light. Therefore, the composition of the present invention is much less hazardous to the environment than the previously available compounds, which included organic solvents which had to be evaporated into the atmosphere in order to cure the finish. To control pre-polymerization viscosity for sprayability, dipping or other means of application, a low molecular weight mono or di-acrylate is used, preferably, as one component of the present composition.

Possible methods of application include spraying, brushing, curtain coating, dipping, and rolling.

Because of the quickness of curing of the present composition, the formulation can be applied in repeated cycles.

The composition of the present invention has the ability, under proper conditions, to be applied, cured, and sanded or burnished within the span of one minute and is then ready for repeated cycles. As such, five or ten coats can be applied in as many minutes.

The composition has the ability to control viscosity by the use of low molecular weight monomers which take the place of organic solvents but which also participate and contribute to final polymer properties. As viscosity can be controlled, the formulation can be used as a stain or sealant. When used on porous substrates such as wood, concrete or SMC, speed of penetration is a direct function of viscosity. Therefore, by controlling the viscosity of the material, depth and speed of penetration before curing can be controlled. Upon curing, the material polymerizes in and about the substrate, providing adhesion thereto. The preferred viscosity of the composition hereof is from about 2 centipoise to about 1500 at 25° C. and preferably from about 2 to about 1200 centipoise at 25° C.

As noted, the present invention enables the production of a substantially solvent-free composition. Thus, the present invention precludes the necessity of non-reactive solvents, such as water, alcohols, volatile organics and the like. However, minor amounts of such may be included without deleteriously affecting the present invention.

Also, it is possible to tailor the properties of the present coating composition, depending on its intended use. Thus, both silicone-based and halogenated organic-based surfactants can be incorporated hereinto.

Where water repellancy or adhesion to silica-type substrates such as glass, concrete, stone and the like is desired, a silicone-based surfactant, such as a siloxane or silane, may be admixed herewith. Although inorganic compounds may be used as well, typically, the silicone is employed as a silane, corresponding to the formula:

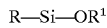

R—Si—OR$^1$ where R and R$^1$ are substituted or unsubstituted linear alkyl or alicyclic having from about 1 to 4 carbon atoms in the alkyl portion thereof.

Some useful silanes are, for example, methyltrimethoxy silane, butyltrimethoxy silane, chlorpropyltrimethoxy silane, glycidyl oxide methoxy silanes, and the like, as well as mixtures thereof. Preferred compounds are glycidoxy methoxy silanes, such as that sold by Dow Corning under the name SILWET RC-73. Other useful wetting agents include the siloxanes corresponding to the formula:

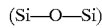

(Si—O—Si)

such as the polydimethyl siloxane fluids. A preferred siloxane is methyloxysiloxane.

Generally, the silicone surfactant is used in an amount, by weight, based on the total composition, ranging from about 0.0001 percent to about 5.0 percent.

Halogenated surfactants are used to achieve high gloss and mar resistance. Useful halogenated surfactants include fluoroaliphatic polymeric esters and alkyl alkoxylates. These halogenated adjuvants are used in the same amounts as the silicone surfactants.

Also, to promote adhesion to metals, an acrylate or methacrylate ester derivative surfactants may be used.

EXAMPLES

A series of coating compositions for use in coating wood were prepared, by mixing together the ingredients, in the order listed, at ambient temperature in the presence of ultraviolet light generated using typical factory lighting. The following table, Table I, lists the ingredients used in parts by weight, based on the total weight of the composition. These compositions were then sprayed onto a wood surface which was then exposed to ultraviolet light from a medium pressure mercury lamp with a peak spectral output in the range of 180–420 nanometers, inclusive, for 5 seconds to initiate the polymerization reaction. In each case, the composition polymerized in less than one minute, and no evaporation of any solvent was required to complete the curing of the composition.

TABLE I

| | FORMULAS | | | | |
|---|---|---|---|---|---|
| | 1 | 2 | 3 | 4 | 5 |
| Photoinitiator A$^1$ | 2.0 | | | | |
| Photoinitiator B$^2$ | | | 4.6 | | |
| Photoinitiator C$^3$ | | | | | 4.0 |
| Photoinitiator D$^4$ | | 4.3 | | | |
| Photoinitiator E$^5$ | | | | 2.0 | |
| Acrylate A$^6$ | 62.0 | | 7.5 | 62.0 | 32.0 |
| Acrylate B$^7$ | 31.0 | | | 31.0 | 64.0 |
| Acrylate C$^8$ | 5.0 | | 43.5 | | |
| Acrylate D$^9$ | | 75.4 | | | |
| Acrylate E$^{10}$ | | 20.3 | 44.2 | | |
| Acrylate F$^{11}$ | | | | 5.0 | |

$^1$1-phenyl-2-hydroxy-2-methyl-1-propanone, sold commercially by CIBA-GEIGY under the mark DAROCUR 1173.
$^2$A combination of oligo {2-hydroxym-2-methyl-1-[4-(methylvinyl)phenyl] propanone} and 2-hydroxy-2-methyl 1-phenyl propan-1-one sold commercially by Sartomer, Inc. under the mark ESACURE KIP 100F.
$^3$1-hydroxycyclohexyl phenyl ketone sold commercially by CIBA-GEIGY Corp. under the mark Irgacure 184.
$^4$2-hydroxy-2-methyl-1-phenyl-propanon-1 sold commercially by CIBA-GEIGY under the mark DAROCUR 4265.
$^5$benzophenone
$^6$trimethylolpropane triacrylate
$^7$1,6-hexanediol diacrylate
$^8$aliphatic urethane acrylate
$^9$ethoxylated bisphenol A diacrylate
$^{10}$trifunctional acrylic ester unsaturated cyclic dione
$^{11}$polyester diacrylate Although the present invention has been described herein with reference to preferred compositions thereof, the foregoing description and examples are intended to be illustrative, and not limitative. Many modifications of the present invention will occur to those skilled in the art. All such modifications which fall within the scope of the following claims are intended to be within the scope and spirit of the present invention.

Having, thus, described the invention, what is claimed is:

1. A sprayable, substantially solvent-free coating composition for applying to a substrate, consisting essentially of:
from about 80 to about 99.5 percent by weight, based on the total composition weight, of a polymerizable compound which comprises a mixture of acrylate, the acrylate mixture comprising a first acrylate and a second acrylate which has a lower molecular weight as compared to the first acrylate, the second acrylate being present in the composition in an amount effective to control pre-polymerization viscosity to a value in a range from about 2 centipoises to about 1500 centipoises at 25° C. to facilitate ease of application,
from about 0.1 to about 15 percent by weight, based on the total composition weight, of a photoinitiator which initiates a polymerization reaction in the composition when it is exposed to ultraviolet light; and
wherein the composition is curable upon exposure to ultraviolet light without requiring evaporation of a solvent therefrom.

2. The composition of claim 1, wherein the polymerizable compound is selected from the group consisting of polyester acrylates, urethane acrylate, monoacrylates, diacrylates, triacrylates, polyacrylates, and mixtures thereof.

3. The composition of claim 2, wherein the polymerizable compound is selected from the group consisting of trimethylol propane triacrylate, 1,6-hexane diol diacrylate, aliphatic urethane acrylates, vinyl acrylates, epoxy acrylates, ethoxylated bisphenol A diacrylate, trifunctional acrylic ester, unsaturated cyclic diones, polyester diacrylates, alkoxylated trimethylolpropane triacrylate, isoboronyl diacrylate, vinyl acrylates, and mixtures thereof.

4. The composition of claim 1, wherein the photoinitiator is selected from the group consisting of 1-phenyl-2-hydroxy-2-methyl-1-propanone, oligo{2 hydroxy-2 methyl-1-[4-(methylvinyl)phenyl]propanone}, 2 hydroxy 2-methyl 1-phenyl propan-1-one, 1-hydroxycyclohexyl phenyl ketone, benzophenones, thioxanthones, camphorphenones, cationic photoinitiators and mixtures thereof.

5. The composition of claim 1, further comprising from about 0.01 to about 90% by weight of a pigment or dye.

6. A method of using a photopolymerizable compound to coat an article of manufacturing, comprising the steps of:
(a) applying a photopolymerizable compound to a surface of the article; the composition consisting essentially of:
(1) the composition of claim 1;
(b) irradiating the compound which has been applied to the surface with ultraviolet light to initiate a polymerization reaction;
wherein the compound polymerizes in place on the article substantially without releasing volatile solvents.

7. The method of claim 6, wherein the article is a porous substrate such that the adhesion is promoted upon polymerization of the composition.

8. The composition of claim 1, wherein the composition comprises 65 to 85 percent of an alkylated triacrylate, 15 to 25 percent of a monoacrylate and oil to 7 percent of the photoinitiator.

9. A sprayable, substantially solvent-free coating composition for applying to a substrate, consisting essentially of:

from about 80 to about 99.5 percent by weight, based on the total composition weight, of a polymerizable compound which comprises;

from about 0.5 to about 15 percent by weight, based on the total composition weight of a photoinitiator which initiates a polymerization reaction in the composition when it is exposed to ultraviolet light; and, wherein the composition is curable upon exposure to ultraviolet light without requiring evaporation of a volatile solvent therefrom, the composition being without an inorganic thickener and without a curing agent; and wherein the polymerized compound comprises at least one acrylate of a low molecular weight in an amount effective to control pre-polymerization viscosity to a value in a range from about 2 centipoises to about 300 centipoises at 25 C.

10. A sprayable coating composition, consisting essentially of:
(a) from about 65 to about 85 percent of an alkoxylated trimethyol propane triacrylate, and
(b) from about 15 to about 25 percent isoboronyl acrylate; and
(c) a silicone surfactant, the composition being curable upon exposure to either ultraviolet light or on electron beam.

11. The composition of claim 10, which further includes:
a photoinitiator for polymerizing the acrylates upon application to a surface to be treated when exposed to ultraviolet light.

* * * * *